(12) United States Patent
Kazerouni

(10) Patent No.: US 12,327,266 B2
(45) Date of Patent: Jun. 10, 2025

(54) ORDER PROCESSING SYSTEMS AND METHODS

(71) Applicant: Linquet Technologies Inc, Vancouver (CA)

(72) Inventor: Pooya H. Kazerouni, Vancouver (CA)

(73) Assignee: Linquet Technologies Inc, Vancouver (CA)

(*) Notice: Subject to any disclaimer, the term of this patent is extended or adjusted under 35 U.S.C. 154(b) by 0 days.

(21) Appl. No.: 18/197,766

(22) Filed: May 16, 2023

(65) Prior Publication Data

US 2024/0161144 A1 May 16, 2024

Related U.S. Application Data

(60) Provisional application No. 63/343,303, filed on May 18, 2022.

(51) Int. Cl.
| | | |
|---|---|---|
| *G06Q 30/02* | (2023.01) | |
| *G06Q 30/0207* | (2023.01) | |
| *G06Q 30/0601* | (2023.01) | |
| *G06Q 40/03* | (2023.01) | |

(52) U.S. Cl.
CPC ..... *G06Q 30/0222* (2013.01); *G06Q 30/0635* (2013.01); *G06Q 40/03* (2023.01)

(58) Field of Classification Search
CPC . G06Q 30/0222; G06Q 30/0635; G06Q 40/03
See application file for complete search history.

(56) References Cited

U.S. PATENT DOCUMENTS

| | | | |
|---|---|---|---|
| 6,728,948 B1 | 4/2004 | Baxter et al. | |
| 7,860,750 B2 | 12/2010 | Hunter et al. | |
| 8,126,777 B2 | 2/2012 | Postelnik et al. | |
| 8,135,630 B2 | 3/2012 | Wadawadigi et al. | |
| 9,811,838 B1 | 11/2017 | Paire et al. | |
| 10,140,453 B1 * | 11/2018 | Fridakis | G06F 21/577 |
| 10,163,140 B2 * | 12/2018 | Robinson | G06Q 30/06 |
| 10,169,807 B2 | 1/2019 | Knipfer et al. | |
| 10,528,969 B2 * | 1/2020 | Benjamin | G06Q 30/0238 |
| 10,740,715 B1 | 8/2020 | Kumar et al. | |
| 11,301,892 B1 * | 4/2022 | Collins | G06Q 20/108 |

(Continued)

FOREIGN PATENT DOCUMENTS

| | | |
|---|---|---|
| CA | 2565408 C | 1/2013 |
| CA | 2478555 C | 7/2016 |

*Primary Examiner* — Thuy N Nguyen

(57) ABSTRACT

The present disclosure provides an order processing system is disclosed, comprising an order receiving unit that receives and indexes orders based on order specifications. The system also includes a provider database, which stores a plurality of provider identifier codes (PICs) that are individually associated with a provider, at least one benefit offered by the provider, and the historical credit information of the provider. The benefit determination unit, which is communicably coupled with the order receiving unit and the provider database, receives the order specifications, identifies a preferred PIC for the received order, and determines a credit difference to be adjusted in order to facilitate availing at least one benefit. The benefit determination unit also updates the historical credit information of the provider associated with the identified preferred PIC and facilitates availing the benefit(s) for a customer.

20 Claims, 4 Drawing Sheets

(56) References Cited

U.S. PATENT DOCUMENTS

| | | | |
|---|---|---|---|
| 11,640,624 B2* | 5/2023 | Brock | G06Q 30/0268 |
| | | | 705/14.53 |
| 2002/0099622 A1* | 7/2002 | Langhammer | G06Q 30/0641 |
| | | | 705/27.1 |
| 2006/0041481 A1 | 2/2006 | Stowe | |
| 2008/0133351 A1* | 6/2008 | White | G07G 1/14 |
| | | | 705/14.27 |
| 2010/0274610 A1 | 10/2010 | Anderson et al. | |
| 2013/0297390 A1* | 11/2013 | Jaquez | G06Q 20/36 |
| | | | 705/41 |
| 2014/0279667 A1 | 9/2014 | Gillen | |
| 2014/0289074 A1 | 9/2014 | White et al. | |
| 2015/0058105 A1* | 2/2015 | Fonseca | G06Q 30/0226 |
| | | | 705/14.17 |
| 2015/0134431 A1* | 5/2015 | Georgoff | G06Q 30/0207 |
| | | | 705/14.13 |
| 2016/0210683 A1 | 7/2016 | Aqlan et al. | |
| 2018/0174093 A1* | 6/2018 | Perez | G06Q 10/083 |
| 2018/0197195 A1* | 7/2018 | Das | G06Q 40/02 |
| 2019/0052549 A1* | 2/2019 | Duggal | G06Q 30/0635 |
| 2019/0073666 A1* | 3/2019 | Ortiz | G06Q 30/0601 |
| 2019/0087213 A1* | 3/2019 | Matters | G06F 9/45558 |
| 2019/0258985 A1* | 8/2019 | Guastella | G06N 20/00 |
| 2019/0386818 A1* | 12/2019 | Cran | H04L 9/3239 |
| 2020/0082427 A1* | 3/2020 | Gleeson | G06Q 30/0226 |
| 2020/0211092 A1 | 7/2020 | Sarin | |
| 2021/0103921 A1* | 4/2021 | Gadwale | G06Q 20/06 |
| 2021/0166259 A1* | 6/2021 | Ballepu | G06Q 30/0226 |
| 2021/0366586 A1* | 11/2021 | Ryan | G06Q 20/3224 |
| 2021/0383423 A1* | 12/2021 | Margolis | G06Q 30/0233 |
| 2022/0092677 A1 | 3/2022 | Yadav et al. | |
| 2022/0180389 A1* | 6/2022 | Yates | G06Q 30/0222 |
| 2022/0207551 A1* | 6/2022 | Mehrhoff | G06K 7/1417 |

* cited by examiner

ORDER PROCESSING SYSTEMS AND METHODS

CROSS REFERENCE TO RELATED APPLICATION

This application claims the benefit under 35 U.S.C. § 119(e) of U.S. Provisional Application No. 63/335,242 entitled "COMPREHENSIVE SYSTEM AND METHOD OF UNIVERSAL, AUTOMATIC, AND ADAPTIVE ORDER GROUPING" filed May 18, 2022, which is incorporated herein by reference.

FIELD OF THE INVENTION

The present invention relates to an order processing system and method, specifically a system and method for order processing to allow various benefits to be unlocked, such as price discounts, free shipping, or any other desired benefit.

BACKGROUND

As e-commerce platforms continue to grow in popularity, there has been an increasing demand for efficient and cost-effective order processing systems that can deliver products and experiences to customers quickly and reliably. Traditionally, e-commerce platforms have relied on a pre-set shipping fee model or a free shipping threshold that incentivizes customers to order a certain amount of items to qualify for free delivery or similar benefits. In many cases, customers may find it difficult to reach the minimum order amount required for free delivery, which can lead to them having to pay shipping costs. This can make the final price of the items they wish to order significantly higher than desired, leading to customer dissatisfaction. One solution could be to offer free delivery to all customers, regardless of their order amount. However, this may not be financially feasible for many retailers, free delivery of all orders may result in a significant financial or resource burden for them. To overcome such limitations, majority of retailers have set minimum order thresholds for free delivery, which can cause issues for customers who cannot reach this threshold.

However, these known fulfilment models are inflexible and may not effectively account for variations in customer preferences, shipping costs, and logistical considerations, which can lead to inefficiencies in order probability, order processing, and delivery. Moreover, these traditional models may not adequately address the diverse needs and preferences of customers, who may prioritize factors such as item specificity, delivery speed, product selection, and environmental sustainability over cost when making purchasing decisions. Consequently, there is a need for a more dynamic and adaptable order processing system that can intelligently manage the related fulfilment benefits.

Furthermore, existing order processing systems may not effectively optimize the distribution of fulfilment benefits (e.g., free delivery incentives) across different customer segments, which can result in a suboptimal allocation of resources and a less-than-optimal customer experience. For example, some customers may be more likely to place an order if they receive a free delivery incentive, while others may be indifferent to such incentives. By better understanding customer preferences and segmenting customers based on these preferences, an order processing system can more effectively distribute order benefits such as free delivery incentives to maximize customer satisfaction and overall business prosperity.

The present invention seeks to address these limitations and provide an improved order processing system that dynamically allocates one or more benefits or incentives to customers based on a variety of factors. This innovative approach aims to increase customer satisfaction and ultimately increase the overall business prosperity of e-commerce platforms and modern businesses.

SUMMARY

Various objects, features, and advantages of the disclosed subject matter can be more fully appreciated with reference to the following detailed description of the disclosed subject matter when considered in connection with the following drawings, in which like reference numerals identify like elements.

The following paragraphs provide additional support for the claims of the subject application.

In an aspect, the present disclosure provides an order processing system that features an order receiving unit for obtaining orders, indexed by order specifications. The system further includes a provider database, connected to a benefit determination unit, wherein the provider database stores provider identifier codes (PICs) associated with individual providers, their offered benefits, and their historical credit information. The benefit determination unit identifies a preferred PIC from the provider database for the received order specification and determines the credit difference required to facilitate availing at least one benefit. This unit also updates the historical credit information of the identified provider and enables customers to access the benefits.

The historical credit information comprises various elements, such as order history, customer ledger, payment history, credit utilization trend and ledger, balance tracker of accumulated credit values, and ordering patterns. The system allows for a range of benefits, including free shipping, discounts, memberships, upgrades, gifts, cash back, and more. The received order is associated with a customer identifier code (CIC), and customer databases store CICs for multiple customers with their historical credit data.

The benefit determination unit updates the historical credit data of the customer database with the credit difference for the received order's CIC. The system also considers criteria such as minimum order specifications, delivery location, and provider location, among others. The benefit determination unit further selects the preferred PIC based on the most desirable fulfillment requirement. The patent also covers an order processing method and a non-transitory computer-readable storage medium for executing instructions related to processing an order.

BRIEF DESCRIPTION OF THE DRAWINGS

The features and advantages of the present disclosure would be more clearly understood from the following description taken in conjunction with the accompanying drawings in which.

DETAILED DESCRIPTION

Figure 1:
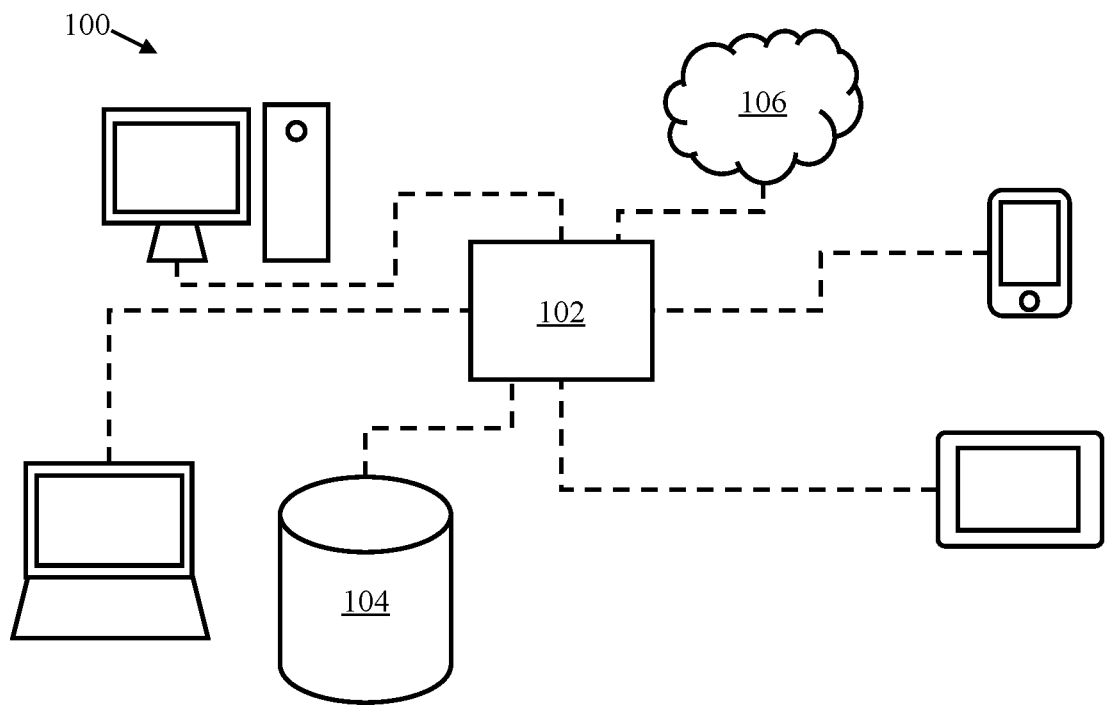
FIG. 1 is a schematic diagram of an order processing system, in accordance with the embodiments of the present disclosure.

The detailed description provided below in connection with the appended drawings is intended as a description of examples and is not intended to represent the only forms in which the present examples can be constructed or utilized. The description sets forth functions of the examples and sequences of steps for constructing and operating the examples. However, the same or equivalent functions and sequences can be accomplished by different examples.

References to "one embodiment," "an embodiment," "an example embodiment," "one implementation," "an implementation," "one example," "an example" and the like, indicate that the described embodiment, implementation or example can include a particular feature, structure or characteristic, but every embodiment implementation or example does not necessarily need to include the particular feature, structure or characteristic. Moreover, such phrases do not necessarily refer to the same embodiment, implementation or example. Further, when a particular feature, structure or characteristic is described in connection with an embodiment, implementation or example, it is to be appreciated that such feature, structure or characteristic can be implemented in connection with other embodiments, implementations or examples whether or not explicitly described.

References to a "module", "a software module", and the like, indicate a software component or part of a program, an application, and/or an app that contains one or more routines. One or more independent modules can comprise a program, an application, and/or an app.

References to an "app", an "application", and a "software application" shall refer to a computer program or group of programs. The terms shall encompass partial programs, standalone programs, low-level software layers, thin client applications, thick client applications, web-based applications, web programs such as a browser, and other similar applications.

Numerous specific details are set forth in order to provide a thorough understanding of one or more embodiments of the described subject matter. It is to be appreciated, however, that such embodiments can be practiced without these specific details.

Various features of the subject disclosure are now described in more detail with reference to the drawings, wherein like numerals generally refer to like or corresponding elements throughout. The drawings and detailed description are not intended to limit the claimed subject matter to the particular form described. Rather, the intention is to cover all modifications, equivalents and alternatives falling within the spirit and scope of the claimed subject matter.

In view of the many possible embodiments to which the principles of the present discussion may be applied, it should be recognized that the embodiments described herein with respect to the drawing figures are meant to be illustrative only and should not be taken as limiting the scope of the claims. Therefore, the techniques as described herein contemplate all such embodiments as may come within the scope of the following claims and equivalents thereof.

The following below are more detailed descriptions of various concepts related to, and implementations of, methods, apparatuses, and systems of determining a credibility status of an image of a person. The various concepts introduced above and discussed in greater detail below may be implemented in any of the numerous ways.

The detailed description is described with reference to the accompanying figures. In the figures, the left-most digit(s) of a reference number identifies the figure in which the reference number first appears. The use of the same reference numbers in different instances in the description and the figures may indicate similar or identical items.

The present invention relates to an order processing system and method, specifically a system and method for order processing to allow one or more benefits to be unlocked, such as price discounts, free shipping, and/or any other desired benefit.

Referring to FIG. 1, there is shown a schematic illustration of an order processing system 100 as per embodiments of the present disclosure. The order processing system 100 can be employed with an interface for processing orders placed by one or a plurality of customers towards an order of products and/or services from one or a plurality of providers. For example, the order processing system 100 can be connected to the e-commerce interface such that orders placed by the plurality of customers are passed through the order processing system 100 prior to reaching the plurality of providers for enabling the order of the products and/or services. In such an example, the order processing system 100 can be associated with a third-party service that acts as an intermediary to enable the order of the products and/or services for the plurality of customers from the plurality of providers. Alternatively, the order processing system 100 can be a part of the e-commerce interface itself such that the orders placed by the plurality of customers are processed by the order processing system 100.

The order processing system 100 comprises an order receiving unit 102 to receive an order. The order receiving unit 102 can be implemented in a server arrangement that is communicable to provider devices associated with one or the plurality of providers and customer devices or points of contact associated with the plurality of customers. For example, the order receiving unit 102 can be implemented as a centralized, decentralized or distributed server that could be coupled to the plurality of provider devices and the plurality of customer devices via a network connection. Further, the plurality of provider devices and the plurality of customer devices can comprise smartphones, smart glasses, smart screens, smart watches, laptops, palmtops, personal computers, digital assistants, AI assistants, and similar interfaces. The plurality of customers can place orders using the customer devices for ordering at least one product from the plurality of providers. For example, a customer named "Jane" places an order for a pair of flip-flops of the brand "Flip-Flop Shoes" from a provider named "Flip-Flop Shop" from a portal "onlineshoeshop.com", such that the pair of flip-flops cost USD 70. In such an example, the order for the pair of flip-flops is received by the order receiving unit 102 via the network. Further, the received order is indexed with an order specification. The order specification could comprise identification information for the ordered product or service, a price of the ordered product or service, a unique identifier for the order, a timestamp associated with placing the order, an interface identifier of the customer device used to place the order, a location from where the order is placed (such as, a location of the customer device when the order is placed), a billing information (e.g., billing address, currency of billing, payment data etc.), a delivery location, a delivery instruction and the like. In the aforementioned example of the customer Jane placing the order for flip-flops, the order specification could comprise the brand name Flip-Flop Shoes of the flip-flops, the domain onlineshoeshop.us from where the order is placed, a name and description of the flipflops such as "Sunlight Flip-Flops for Women—size 7", delivery address, a unique identifier for the order such as "RFFW#00292" and the like.

The system 100 further comprises a provider database 104 communicably coupled with a benefit determination unit 106. The provider database 104 stores information corresponding to one or the plurality of providers offering products and/or services to one or the plurality of customers. Such providers could comprise a group of all providers registered at a directory or portal. Alternatively, when the directory or portal is an aggregator of providers offering a particular product and/or service, the providers could comprise all the providers that have been aggregated until the present time. The provider database 104 stores a plurality of provider identifier codes (PICs). The provider identifier code can be a unique alphabetical or numerical or alphanumeric code (with or without one or more special characters) to distinguish a specific provider from other providers whose information is stored within the provider database 104. Further, each PIC is individually associated with a provider and at least one benefit offered by the provider. The provider can be an individual entity offering products and/or services (such as, a local vendor) or a commercial entity partaking in the sale of products and/or services, such that multiple individual entities are comprised within the commercial entity (such as, a retain corporation). Further, each provider is associated with at least one benefit offered by the provider. The term "benefit" as used throughout the present disclosure relates to a benefit offered by the provider to the customers that order from products and/or services from the provider, such that the customers fulfill each condition placed by a corresponding provider for availing the benefit.

In one embodiment, the least one benefit is selected from: a free shipping, a discount, a free item, a membership, an upgrade, a gift, a cash back, a special access, an extended warranty, a loyalty credit, a complementary perk, an extended payment term, a free installation service, a cancellation charges waive off, a discount coupon for another order, or a combination thereof. Table 1 below provides examples of at least one benefit that could be offered by the plurality of providers.

TABLE 1

| S. No. | Benefit | Example |
|---|---|---|
| 1. | Free shipping | Free shipping on all orders of $99 or above in the U.S. |
| 2. | Discount | 10% off for customers placing their first order with us |
| 3. | Free item | Free t-shirt with order of apparel from our latest collection |
| 4. | Membership | No-cost premium membership of 1 additional month on every order of an annual pack |
| 5. | Upgrade | Book two or more business class tickets and get 1 free upgrade to business class for your next journey |
| 6. | Gift | Send a free bouquet with your cake order for Valentine's Day. Valid only on orders within Canada |
| 7. | Cash back | $5.99 cash back for every $100 spent |
| 8. | Special access | Access to exclusive rewards club for the first 1000 shoppers that order more than 8 items |
| 9. | Extended warranty | 6 additional months upon order of a 1-year extended warranty |
| 10. | Loyalty credit | 10 loyalty points for every $1 spent. $10 minimum order value |
| 11. | Complementary perk | Pay with a credit card and book 5 electric car recharge slots for free at any of our locations |
| 12. | Extended payment term | Pay 50% now and the remaining 50% within 3 years from the date of order |
| 13. | Free installation service | Free installation with every new order of technology product from local installer |
| 14. | Cancellation charges waive off | Cancel for free before the 5$^{th}$ of every month |
| 15. | Discount coupon for another order | Pay full price now and get 50% off on your next 2 orders |
| 16. | Combination of free shipping and extended warranty | Free shipping and 1-year extended warranty with every new order of product |
| 17. | Combination of membership and upgrade | Sign up for 2 years and get upgraded to gold membership with 6 additional months free |

Further, each benefit is indexed, individually, with a criterion. The term "criterion" as used throughout the present disclosure relates to the condition(s) imposed by the corresponding provider for availing the benefit by ordering the products and/or services from the provider.

In one embodiment, the criterion/criteria are selected from a minimum order specification to accept the received order, a minimum order specification to deliver the received order, a delivery location, a location of the provider, a predefined order specification to handle the received order for free and a required specification to ship the order for free. Table 2 below provides examples of the criterion/criteria corresponding to some of the exemplary benefits of Table 1.

TABLE 2

| S. No. | Benefit | Criteria/criterion for availing the benefit | Example |
| --- | --- | --- | --- |
| 1. | Loyalty credit | Minimum order specification to accept the received order | 10 loyalty points for every $1 spent. $10 minimum order value |
| 2. | Special access | Minimum order specification to deliver the received order | Access to exclusive rewards club for the first 1000 shoppers that shop for over $599 |
| 3. | Free shipping | Delivery location | Free shipping on all orders of $99 or above in Vancouver, Canada. |
| 4. | Complementary perk | Location of the provider | Pay with a credit card and book 5 electric car recharge slots for free at any of our malls |
| 5. | Free installation | Predefined order specification to handle the received order for free | Free installation with every new order of electronic product from a local technician |
| 6. | Gift | Required specification to ship the received order for free | Send a free bouquet with your cake order for Valentine's Day. Valid only on orders within Canada |

The PIC can be indexed with provider location. The term "provider location" refers to geographical positioning of an individual or business entity that offers products or services, through an online marketplace or e-commerce platform. The provider location can be selected from the locations of the manufacturing site, warehouse, retail store and last mile order fulfillment center.

Moreover, each PIC is individually associated with the historical credit information of the provider. The term "historical credit information" as used throughout the present disclosure relates to information associated with the past activity of the provider of using the order processing system 100 for receiving and dispatching orders for products and/or services from the plurality of providers. In one embodiment, the historical credit information comprises an order history, a customer ledger, a payment history, a credit utilization trend and ledger, a balance tracker of all accumulated credit values and an order pattern. The term "order history" as used throughout the present disclosure relates to information of all orders processed by a particular provider using the order processing system 100. For example, the order history could comprise a list of orders processed by the provider since joining the provider at an online platform associated with the order processing system 100. In another example, the order history could comprise a list of orders processed by the provider within a specific duration (such as, past 3 years). The term "customer ledger" as used throughout the present disclosure relates to an ordered or unordered list of customers that have placed an order with a particular provider. For example, the customer ledger could comprise a chronological list of customers that have placed an order from the provider. The term "payment history" as used throughout the present disclosure relates to information associated with all financial transactions of a particular provider processed using the order processing system 100. It would be appreciated that such financial transactions could comprise incoming transactions, such as payments made to the provider for orders of products and/or services made from the provider by a plurality of customers. Alternatively, the financial transactions could comprise outgoing transactions, such as payments made by the provider for products and/or services made by the provider (as a customer) from other providers. The term "credit utilization trend and ledger" as used throughout the present disclosure relates to credit and/or debit information associated with credits paid to the provider or credits utilized by the provider (as a customer). Such credit and/or debit information can be saved in a separate digital ledger for each individual provider using the order processing system 100. The term "balance tracker of all accumulated credit values" relates to information of all credit values paid to a specific provider as a part of orders placed from the provider by the plurality of customers. The term "order pattern" as used throughout the present disclosure relates to chronological information associated with order of products and/or services made from the provider by the plurality of customers. Such an order pattern couple optionally comprises chronological information associated with orders of products and/or services made by the provider (as a customer) from other providers.

The order processing system 100 further comprises the benefit determination unit 106 communicably coupled with the order receiving unit 102 and the provider database 104. The benefit determination unit 106 can be implemented using hardware elements, software modules or a combination of hardware elements and software modules. For example, the benefit determination unit 106 can be implemented in a server arrangement that is communicably coupled to the order receiving unit 102 and the provider database 104 via the Internet. In one example, the benefit determination unit 106 can be implemented as a cloud-based software application, hosted on a server arrangement, for instance, a public cloud server arrangement or a private cloud server arrangement. Further, the term "public cloud server arrangement" relates to a combination of hardware and software resources and managed by an organization, such that the combination of hardware and software resources are not shared with external entities (such as, other organizations). The cloud server arrangement can comprise a hardware layer, an infrastructure layer, a platform layer and an application layer. The term "software module", and "software application", when referred to as "implemented in a computer-readable storage medium", includes computer-readable instructions stored in a memory unit. Further, a processing unit is configured to "execute a software program" when at least one value associated with the software program is stored in a register that is readable by the processing unit. For example, routines executed to implement various processes disclosed herein can be implemented as part of an operating system software (such as, Microsoft Windows® or Linux®) or a specific software application, algorithm component, program, object, module, or sequence of instructions referred to as computer programs. It will be appreciated that computer programs comprise instructions set at various times in memory units of computing devices, which, when read and executed by processing units, will cause the computing devices to execute functions involving the disclosed processes. Optionally, a carrier comprising the disclosed computer program is provided. The carrier can be implemented as an electronic signal, an optical signal, a radio signal or a non-transitory computer storage medium.

In one example, a set of virtual machines, including a plurality of different, independent virtual machines, is managed or supervised by a hypervisor. Each virtual machine can be implemented as a software container having an operating system that hosts at least one software application. Each virtual machine can be decoupled from a host server by the hypervisor, add virtual machines or close virtual machines based on workload or other characteristics.

Further, access to the cloud server arrangement by a plurality of client devices (such as provider devices and customer devices) can be allowed over a network. Optionally, different levels of service can be provided by the cloud server arrangement. For example, users of the client devices are provided access to software applications and databases. In such an example, the infrastructure and platforms that run the software application are managed by the cloud server arrangement. Consequently, the software application is software as a service (SaaS). The software application is operated in the application layer and end-users access the software application through the plurality of client devices.

Optionally, the platform layer is utilized to provide a platform as a service (PaaS) by the cloud server arrangement. Such a PaaS can comprise an operating system, a programming language execution environment, a database as well as web browsers provided to the client devices. In one example, PaaS is provided to application developers to develop and run software applications. In such an example, underlying hardware, infrastructure and software layers are managed by the cloud server arrangement.

Optionally, the infrastructure layer is utilized to provide an infrastructure as a service (IaaS) by the cloud server arrangement. In such a service, utilization of physical machines, virtual machines, as well as hardware infrastructure, is provided as a service by the cloud server arrangement. Such a utilization can be provided on demand by the cloud server arrangement, such as, from large pools in data centers.

The cloud-based software application can enable processes such as computation, software, data access and/or data storage services that do not require end-user knowledge of the physical location or configuration of hardware elements that deliver such processes. The benefit determination unit 106 receives from the order receiving unit 102, the order specification. The benefit determination unit 106 receives the order specification as soon as the order is received by the order receiving unit 102 (such as, upon placing of a new order by a customer using the customer device associated with the customer). Alternatively, the benefit determination unit 106 receives order specification of a plurality of orders that are stored within the benefit determination unit 106 after predefined durations, such as, after 1 microsecond, 5 microseconds, 10 microseconds and the like. The benefit determination unit 106 identifies a preferred PIC from the provider database 104 for the received order specification. The benefit determination unit 106 can perform such a determination based on the at least one benefit offered by the provider and the historical credit information of the provider. For example, when the order specification for an order of headphones provides that the headphones are priced at $220, the benefit determination unit 106 can determine providers offering the at least one benefit to customers purchasing headphones that are priced at or around $220. For example, the benefit determination unit 106 determines that a provider (such as a digital store) "AllHeadphones" offers free shipping for headphones priced at $200 or above whereas another provider "HeadphonesMall" offers free shipping, a gift of a free carrying case as well as a discount coupon for a next order with order of headphones costing $250. In such an example, the benefit determination unit 106 identifies the provider HeadphonesMall to be the preferred PIC for processing the $220 order of headphones. In an exemplary embodiment, benefit determination unit 106 can consider the location of the provider and customer to identify the preferred PIC. The location-based identification of PIC can provide additional benefits such as faster delivery, lower probability of product damage during transit, and reduce delivery associated costing parameters such as tax, packaging charges, delivery charges etc. Furthermore, location-based PIC identification can be essential for certain categories of products such as perishable items such as food. The benefit determination unit 106 determines, for the identified preferred PIC, a credit difference to be adjusted to facilitate availing the at least one benefit. The term "credit difference" as used throughout the present disclosure relates to a quantity of money or points to be adjusted to a value of the order to increase or decrease the value of the order to the amount for which the benefit is offered by the preferred PIC. In one example, the preferred PIC offers free shipping for orders of $50 or above and the value of the order is $24.99. In such an example, the credit difference is $25.01, such that $25.01 is required to be added to the value of the order. In another example, the preferred PIC offers free installation upon expenditure of 100 points or more and the value of the order is 110 points. In such an example, the credit difference is 10 points, such that 10 points of credit are required to be removed from the value of the order. In the aforementioned example in which HeadphonesMall is the preferred PIC, the value of the order is $220 and the preferred PIC offers benefits for orders above $250, the benefit determination unit 106 determines that $30 are required to be added to the value of the order. The benefit determination unit 106 updates the historical credit information of the provider of the identified preferred PIC. The benefit determination unit 106 updates the historical credit information of the provider of the identified preferred PIC with the received order such that the historical credit information reflects the credit difference added to the value of the order to enable availing of the benefit offered by the provider for the order. In the aforementioned example, the benefit determination unit 106 updates the historical credit information of HeadphonesMall to show that headphones worth $250 have been ordered, thereby, enabling to avail benefits associated with the free shipping, the gift of the free carrying case as well as the discount coupon for a next order to be provided. Subsequently, the benefit determination unit 106 facilitates to avail the at least one benefit for a customer. The benefit determination unit 106 provides details associated with the order, such as customer information, shipping information and the like to the provider to enable the customer to obtain benefits associated with the order.

In one embodiment, credit values accumulated with the provider or customer can be employed outside the order processing system 100. For example, a provider "HomeAutomationSupplies" has stored credits worth $12,757, such that the credits are accumulated from providing products and/or services to the plurality of customers. In such an example, the provider HomeAutomationSupplies can employ the credits worth $12,757 for purchasing products and/or services from providers that are not registered with the order processing system 100, convert the credits into real-world currency (such as, through a bank or a third-party service) and the like. In one embodiment, the provider can exchange/trade credits with other providers and/or customers, such as, for purchasing products and/or services from other providers and/or customers. In one example, the credits can be implemented as cryptographic coins that can be exchanged within the order processing system 100 as well as out of the order processing system 100.

In one embodiment, the benefit determination unit 106 comprises a filtering unit that adaptively groups multiple orders received from the plurality of customers. For example, the benefit determination unit 106 performs the adaptive grouping based on specific parameters in real-time or near real-time. In one example, the specific parameters comprise minimum order value, shipping location, provider location and the like. Optionally, the benefit determination unit 106 performs the adaptive grouping to fulfill a criterion for availing a benefit for at least one customer. For example, a customer "John" places an order for a t-shirt costing $70 and for a pair of trousers priced at $30 from the same provider "ApparelHouse". The provider ApparelHouse offers free shipping on orders of $90 or more. In such an example, the benefit determination unit 106 groups the orders for the t-shirt and the pair of trousers to provide free shipping on a single order comprising the t-shirt and the pair of trousers. In another example, the customer John places an order for a t-shirt costing $70 and another customer "Jake" places an order for a different t-shirt priced at $50 at the provider ApparelHouse. Further, the provider ApparelHouse offers free shipping on orders of $100 or above. The customers John and Jake are located proximally to each other. In such an example, the benefit determination unit 106 groups the orders by the customers—John and Jake such that the benefit of free shipping can be offered to the orders for the individual t-shirts by the customers—John and Jake. Optionally, the benefit determination unit 106 ships the orders for both the customers John and Jake to John (or Jake). Subsequently, the benefit determination unit 106 enables the collection and shipping of the order of Jake from the location of John (or the order of John from the location of Jake).

The plurality of provider devices and the plurality of customer devices can each comprise at least one processing unit, at least one memory unit, at least one communication unit, at least one input/out unit and at least one mass storage unit, such that all the aforesaid units are communicably coupled to each other through an interconnect. The interconnect can comprise at least one conductive trace, bus, point-to-point connection, controller, adapter and/or other conventional connection devices. Further, the processing unit controls the overall processing operations of the corresponding provider devices and customer devices. Such a processing unit can comprise, but is not limited to, general purpose programmable microprocessors, digital signal processors, mobile application processors, microcontrollers, application specific integrated circuits, programmable gate arrays or a combination of such processing units.

At least one memory unit can comprise physical storage devices such as random-access memory, read-only memory, flash memory, miniature hard disk drive or a combination of such memory units. At least one communication unit can comprise Ethernet adapters, cable modems, digital subscriber line modems, WiFi adapters, cellular transceivers (such as a 3G, LTE/4G, 5G and the like), baseband processors, Bluetooth or Bluetooth low energy transceivers, serial communication devices or a combination of such communication units. At least one input/output unit can comprise a display (such as a touchscreen display), an audio speaker, a keyboard, a mouse (or other pointing device), a microphone, a camera or a combination of such input/output units. Further, at least one mass storage unit can be implemented as hard drives, digital versatile disks, flash memories or the like. Moreover, each memory unit and mass storage unit can individually or collectively store data and instructions that configure the processing units to execute various operations.

The plurality of customer devices can employ a web browser to transmit and/or receive information associated with the order processing system 100, such as, for placing orders for products and/or services.

Figure 2:
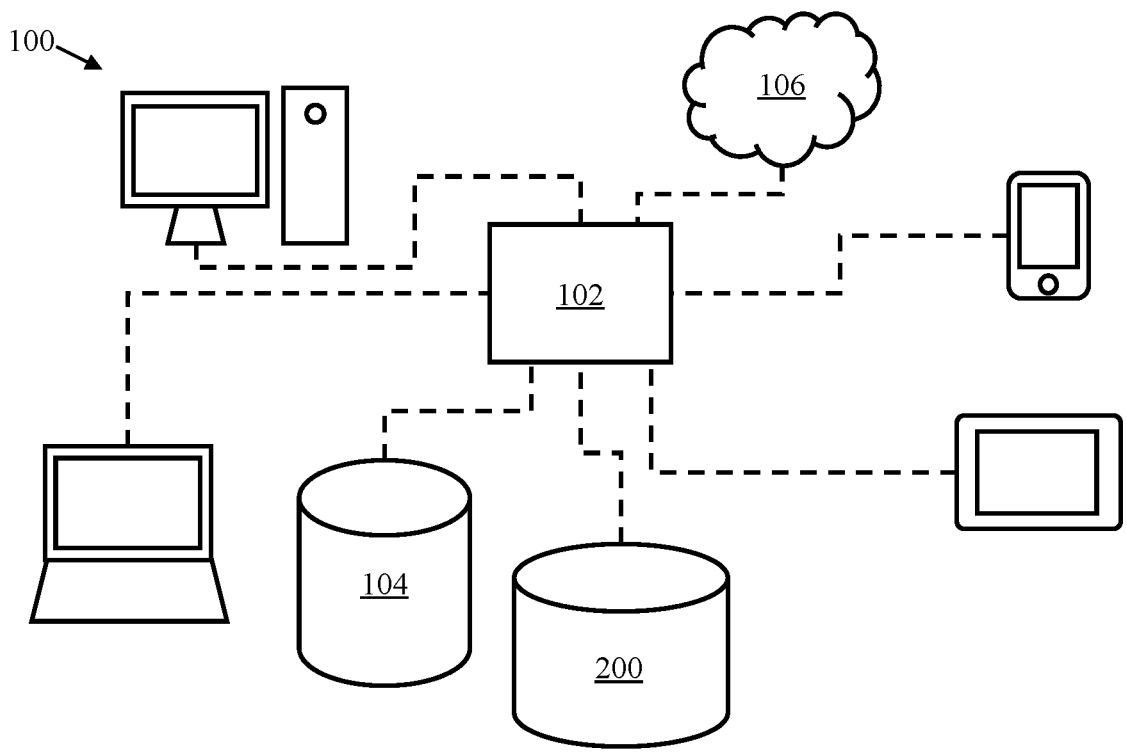
FIG. 2 is a schematic diagram of another order processing system, in accordance with the embodiments of the present disclosure.

Referring to FIG. 2, there is shown another schematic illustration of the order processing system 100 of FIG. 1, in accordance with the embodiments of the present disclosure. The received order is further associated with a customer identifier code (CIC) of the customer from whom the order is received. It will be appreciated if the customer can be an individual customer, for example, a parent placing the order for a children's product on behalf of their child. Alternatively, the customer can be a part of a large entity such that the entity comprises a plurality of individuals. For example, the entity can be a corporate establishment having a plurality of departments dedicated to different operations. In such an example, the customer can be represented by the name of the corporate establishment, such as, "1A@B#C6 Company". However, the order may have been placed by a human resources department of the corporate entity, an accounts department of the corporate entity and the like. Further, the CIC is a unique alphanumeric code that enables to distinguish one customer (such as an individual or a corporate establishment) from other customers.

The CICs of a plurality of customers are stored in a customer database of 200. The customer database 200 can be implemented as a hardware component, a software application or preferably, a combination of hardware components and software applications that store CICs of the plurality of customers. It will be appreciated if the CICs can be stored in different manners, such as, in an alphabetic order, a chronological order based on orders placed by customers, an order of the highest number (or value) of orders placed by customers and the like. Optionally, the customer database 200 further stores relations between various CICs. Customer database 200 can store such information in a personally non-identifiable manner. For example, "Jane" and "Joe" are associated with CIC #2176 and CIC #3472. Further, Jane and Joe work as nurses in "X*Y%Z Hospital", such that X*Y%Z Hospital is associated with CIC #272. In such an example, the customer database 200 stores information that CIC #2176 and CIC #3472 are related to the CIC #272. Further, each CIC is individually associated with historic credit data of the customer. The term "historic credit data"

as used throughout the present disclosure relates to information of previous orders placed by a CIC. In one embodiment, the historic credit data comprises: an order history, a customer ledger, a payment history, a credit utilization trend and ledger, a balance tracker of all accumulated credit values and an order pattern. The term "order history" as used throughout the present disclosure relates to information of past orders placed by the customer, such as, orders placed by the customer since joining an online platform associated with the order processing system 100, providers from whom the orders were made and the like. The term "customer ledger" as used throughout the present disclosure relates to a digital ledger that stores details associated with transactional activities of the customer on the online platform associated with the order processing system 100. Such details could include, but are not limited to, dates and/or timestamps associated with ordered made by the CIC, providers from whom a CIC has ordered products and/or services, preferred providers for the CIC and the like. The term "payment history" as used throughout the present disclosure relates to total amount of expenditure done by a particular CIC for purchasing various products and/or services, individual expenditures for purchasing each product and/or service, payment methods employed for purchasing particular products and/or services and the like. The term "credit utilization trend and ledger" relates to credit information associated with the CIC, including but not limited to, orders (such as, amounts associated with the orders) for which credits were utilized, an order value threshold for which the CIC is the most likely to utilize credits and suchlike. Such information can be stored in a chronological manner in a digital ledger associated with each CIC. The term "balance tracker of all accumulated credit values" as used throughout the present disclosure relates to the total number of credits utilized by a CIC for availing benefits. Further, the term "order pattern" as used throughout the present information relates to times of a year during which the CIC is most likely to make orders, benefits that the CIC is most likely to avail over other benefits, providers that the CIC is most likely to prefer over other providers and the like.

The benefit determination unit 106 updates the historic credit data of the customer database 200 with the credit difference for the CIC of the customer from whom the order is received. In the example mentioned hereinabove, the credit difference of $25.01 is required to be added to the value of the order, such as, the order placed by a customer named "Jack" having CIC #7520. Further, the customer Jack has previously availed total credit of $196. In such an example, the historic credit data of the customer database 200 is updated with the credit difference of $25.01, such that the availed total credit $221.01.

The benefit determination unit 106 further identifies a first set of PICs from the provider database 104, based on the customer location information and the order specification. The benefit determination unit 106 identifies multiple PIC from the plurality of PICs stored within the provider database 104 such that the multiple PICs are located proximally to the customer location of the customer that placed the order. Further, each of the multiple PICs is capable of delivering the required product and/or service at the required price, within the specified shipping duration and with the benefits requested or applicable to the customer. The benefit determination unit 106 compares the customer location information with each provider's location data to determine a fulfillment requirement associated with each provider of the first set of PICs. The fulfillment requirement comprises a shipping value and related requirements of the received order. The benefit determination unit 106 performs the comparison to determine the lowest shipping cost as well as the lowest shipping duration for shipping the products and/or services by each provider of the first set of PICs. Subsequently, benefit determination unit 106 selects the preferred PIC from the first set of PICs to avail the least one benefit based on a most desirable fulfillment requirement. For example, a customer "Jill" places an order for a microwave that can be shipped for free by two PICs: "Cook_Shop" and "Microwave1!Store". Cook_Shop has an outlet located at a distance of 15 km from a location of Jill and therefore, takes 2 days to ship the ordered microwave whereas Microwave1!Store has an outlet located at a distance of 2 km from the location of Jill and can ship the microwave on the same day of receiving the order. Consequently, benefit determination unit 106 identifies Microwave1!Store as the preferred PIC for processing the order for the microwave by Jill.

In an embodiment, information about various providers, their benefits, and historical credit information can be stored and managed in the customer database 200. The benefit determination unit 106 interacts with this database to find the best deal for customers based on their order specifications.

In an exemplary scenario, e-commerce platform can have multiple providers offering their products with various benefits. The customer database 200 can store information about these providers, their benefits, and historical credit information, which can be used by the benefit determination unit 106 to make informed decisions. The customer database 200 can be depicted as below:

| PIC | PROVIDER NAME | BENEFITS | CRITERION | HISTORICAL CREDIT INFORMATION |
|---|---|---|---|---|
| adfto9_1 | SA-001_BL | Free shipping and 10% discount on laptops | min. order $500 | −17 |
| | | Free shipping on furniture | orders over $230 | |
| | | Free transit insurance on home appliance | min. order $100 | |
| 105_jim09 | PRNOIP | Free shipping | min. order value 80 $ | −35 |
| 40_40_guj | guj_5_81@ | 5% discount on smartphones + free screen protector | min order value 350 $ | 10 |
| 95866711 | derik0065 | Free shipping on laptops | min. order $450 | −15 |

Upon receiving, the order specification (e.g., laptop having price 459 $) from the order receiving unit 102, the benefit determination unit 106 may access customer database 200 to identify a list of providers offering products (e.g., laptop) that match order specification. The benefit determination unit 106 may consider at least one parameter from (a) provider having minimum negative historical credit information or having maximum positive credit information; (b) provider provides best benefits; (c) rating of the provider; (d) service area that matches with delivery location; and (e) previous order history of customer with a particular provider. The benefit determination unit 106 may analyze the benefits offered by these providers (e.g., ADFTO9_1and 95866711) to identify the preferred PIC. In our example, benefit determination unit 106 will identify provider SA-001_BL as the preferred PIC, as it offers a 10% discount on laptops and also has minimum historical credit. The benefit determination unit 106 then determines the credit difference (e.g., 500−459=41 $) required to avail the 10% discount and updates the historical credit information of provider SA-001_BL accordingly. Finally, the benefit for the customers can be facilitated, providing a seamless and optimized shopping experience to the user/customer. The updated credit information of SA-001_BL would be 24(41−17), and the same can be used to serve another order.

The term "historical credit information", in the context of a customer database 200, refers to credit points accumulated over time, reflecting the provider's activities, trustworthiness, and reliability. It helps the benefit determination unit 106 to assess the provider's performance and reputation while identifying the best deal for customers. Further, historical credit information refers to comprehensive data pertaining to an individual's past financial behavior, particularly related to their use of credit. This information includes details such as payment history, outstanding debts, types of credit accounts, length of credit history, and any instances of defaults, bankruptcies, or late payments.

Figure 3:
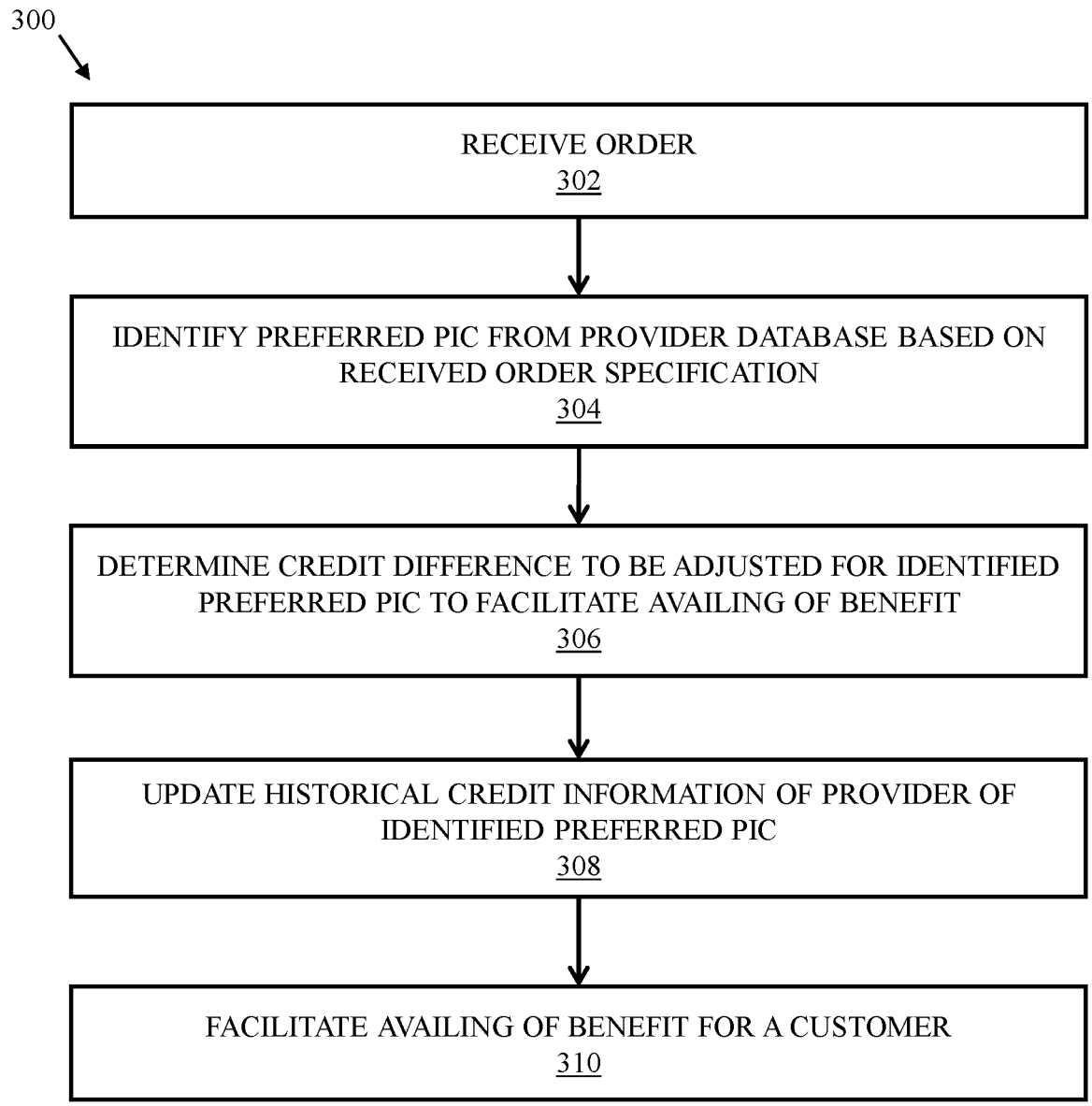
FIG. 3 is a flowchart of an order processing method, in accordance with the embodiments of the present disclosure.

Referring to FIG. 3, there is shown a flowchart of an order processing method, in accordance with the embodiments of the present disclosure. At step 302, an order is received. The received order is indexed with an order specification. The customer can utilize a customer device that can access an online platform, such as an e-commerce website or mobile application to make an order. The order contains information regarding the product or service being ordered, includes order specifications that may comprise details such as product type, price, and any additional preferences or requirements specified by the customer. At step 304, a preferred PIC is identified from a customer database 200, based on the received order specification. Upon receiving the order, customer database 200 can be utilized to identify the preferred provider based on the received order specification. The provider database may include information about each provider's product or service offerings, historical performance, customer ratings, and other relevant factors. For instance, customer Mr. Jacob placed an order for a smartphone with specific features and a price range. The preferred PIC can be determined based on the providers offering the desired smartphone with the best ratings, price, and additional customer preferences. To identify the preferred PIC, machine learning algorithms, such as clustering or recommendation algorithms, can be used to analyze and compare provider data against the customer's order specification. At step 306, a credit difference to be adjusted is determined for the identified preferred PIC to facilitate availing the at least one benefit determining. This credit difference may be based on factors such as provider performance, customer loyalty, promotional offers, or a combination thereof. In some embodiments, a dynamic pricing algorithm can be deployed to adjust the credit difference based on real-time market conditions or available inventory.

At step 308, the historical credit information of the provider of identified preferred PIC is updated. This update may include adding or subtracting the credit difference and any other relevant credit adjustments to the provider's historical credit record. This updated information can be used to monitor the provider's performance, improve the provider database, and inform future credit adjustments or benefits for the customer. At step 310, at least one benefit is facilitated to be availed for a customer.

In one embodiment, the received order is associated with a customer identifier code (CIC) of the customer from whom the order is received.

In another embodiment, the CICs of a plurality of customers are stored in a customer database. Further, each CIC is individually associated with the historic credit data of the customer.

In yet another embodiment, the method 300 further comprises steps of receiving an updated information associated with a cancellation request, a return request or a modification request from the customers associated with the CIC for the received order and balancing the credit value based on the received update information to avail the least one benefit.

In still another embodiment, the at least one benefit is selected from a free shipping, a discount, a free item, a membership, an upgrade, a gift, a cash back, a special access, an extended warranty, a loyalty credit, a complementary perk, an extended payment term, a free installation service, a cancellation charges waive off, a discount coupon for another order, or a combination thereof.

In a further embodiment, the method 300 further comprises steps of receiving updated information associated with a cancellation, return or modification by the customer associated with the CIC for the received order and balancing the credit value for the related CICs and PICs based on the received update information to avail the at least one benefit.

In a still further embodiment, method 300 further comprises a step of comparing the customer location information with the provider location data to determine a fulfillment requirement associated with each provider of the first set of PICs. The fulfillment requirement comprises a shipping value and related requirements of the received order. Method 300 also comprises a step of selecting a desired PIC from the first set of PICs to avail at least one benefit based on a most desirable fulfillment requirement.

Figure 4:
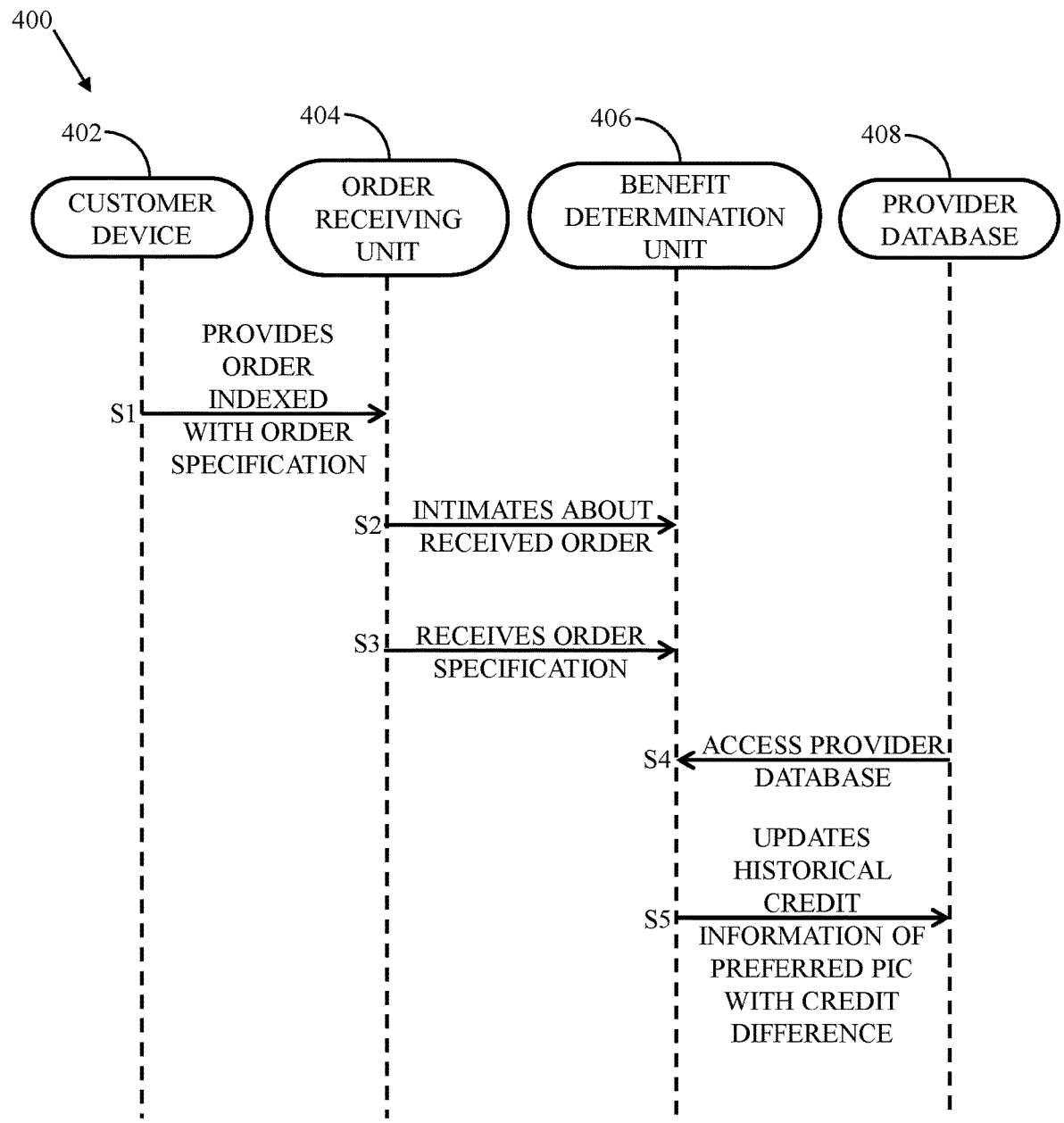
FIG. 4 is a process diagram of processing an order by order processing system, in accordance with the embodiments of the present disclosure.

Referring to FIG. 4, there is shown a process diagram of processing an order by an order processing system 400 (such as the order processing system 100 of FIG. 1), in accordance with the embodiments of the present disclosure. The system comprises a customer device 402, an order receiving unit 404 (same as 102), a benefit determination unit 406 (same as 106), and a provider database 408 (same as 104). The process begins at step S1, where the order receiving unit 404 obtains an order from the customer device 402, with the received order indexed according to its order specification (e.g., brand, model, color, shipping address etc.).

In step S2, the order receiving unit 404 notifies the benefit determination unit 406 about the received order. Following this, at step S3, the benefit determination unit 406 acquires the order specification from the order receiving unit 404. In step S4, the benefit determination unit 406 accesses the provider database 408 to identify preferred PIC for the received order. The benefit determination unit 406 then calculates a credit difference to be adjusted to enable the customer to avail a benefit for the received order. For instance, if the benefit is a $10 discount, the unit determines the credit difference (i.e., add 2 $ to order value) necessary for the customer to qualify for the discount.

Finally, at step S5, the benefit determination unit 406 updates the historical credit information (deduct 2 $ from the existing credit balance of the provider associated with the preferred PIC) of the preferred PIC with the calculated credit difference in the provider database 408.

In another embodiment, the provider database, the customer database, and the order are accessible on a distributed ledger. The distributed ledger is a decentralized and secure method of storing and sharing data among multiple parties, communicably coupled with an order processing platform. It ensures data integrity, transparency, and traceability for all parties involved in the order processing system 100. Both the provider and customer databases, as well as the order and credit values, are accessible on the distributed ledger. This eliminates the need for centralized control and prevents data manipulation, enhancing the overall security and trustworthiness of the system.

Further disclosed is a non-transitory computer-readable storage medium, comprising executable instructions that, when executed by a microprocessor, for processing an order. The instructions comprise arranging, a server arrangement comprising a non-transitory storage device that is arranged to store a set of executable routines and utilizing, the microprocessor which is coupled to the non-transitory storage device and operable to execute the set of routines for receiving, an order, wherein the received order is indexed with an order specification; identifying, a preferred PIC from a provider database based on the received order specification; determining, for the identified preferred PIC, a credit difference to be adjusted to facilitate availing the at least one benefit; updating, the historical credit information of the provider of the identified preferred PIC; and facilitating, to avail at least one benefit for a customer.

A software program or algorithm, when referred to as "implemented in a computer-readable storage medium," includes computer-readable instructions stored in a memory device. A processor is "configured to execute a software program" when at least one value associated with the software program is stored in a register that is readable by the processor. In some embodiments, routines executed to implement the disclosed techniques can be implemented as part of OS software (e.g., MICROSOFT WINDOWS® and LINUX®) or a specific software application, algorithm component, program, object, module, or sequence of instructions referred to as "computer programs".

Figure 5:
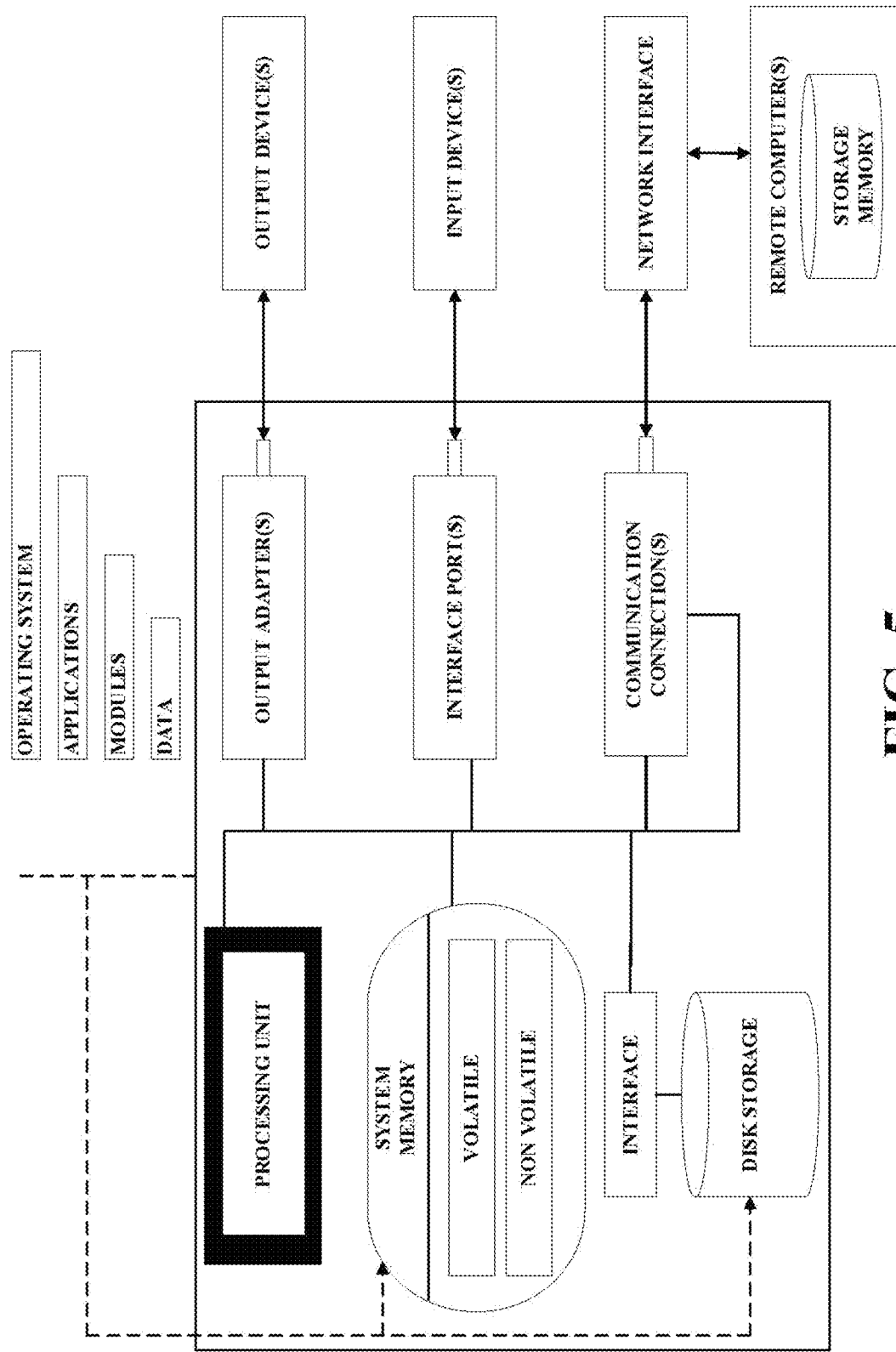
FIG. 5 portrays an exemplary computing resource that can be deployed for automatic order processing, in accordance with the embodiments of the present disclosure.

FIG. 5 portrays an exemplary computing resource (e.g., order receiving unit 102, customer devices, benefit determination unit 106 and the like) that can be deployed for automatic order processing, in accordance with the embodiments of the present disclosure. The computer resources may include a processing unit (e.g., CPU, processor etc.), input device, output device (e.g., monitors, speakers, printer), a memory (e.g., RAM, ROM, CD-ROM, DVD-ROM, removable or non-removable data storage medium), and a system bus that can be configured for coupling of the components such as memory, processing unit, etc. The system bus can be selected from a peripheral bus or external bus, 8-bit bus, Industrial Standard Architecture (ISA), Micro-Channel Architecture (MSA), Extended ISA (EISA), and any variety of available bus architectures to enable highspeed data transfer. The memory can comprise firmware or software or an operating environment that acts as an intermediary link between users and the basic computer hardware. Generally. Users provide input or commands to the computing resource through input devices (e.g., mouse, trackball, stylus, touch pad, keyboard, microphone, joystick, remote control, and the like). The input device can be connected to the processing unit through the system bus via an interface port (e.g., universal serial bus (USB) port, serial port, parallel port etc.). The computing resource can operate in a networked environment using logical connections to one or more remote computers, such as a remote computer (e.g., a personal computer, a server, a router, a network PC, a workstation, other common network node and the like) through a network interface such as local-area networks (LAN), wide-area networks (WAN). WIFI, Bluetooth and the like. The computing resource may additionally comprise necessary hardware (e.g., modems including regular telephone grade modems, cable modems and DSL modems, ISDN adapters, and Ethernet cards) and associated software, which can be necessary for connection to the network interface.

All references to "a/an/the element, apparatus, component, means, step, etc." are to be interpreted as referring to at least one instance of the element, apparatus, component, means, step, etc., unless explicitly stated otherwise. The steps of any method disclosed herein do not have to be performed in the exact order disclosed, unless explicitly stated. The discussion above and below in respect of any of the aspects of the present disclosure is also in applicable parts relevant to any other aspect of the present disclosure.

The wordings such as "include", "including", "comprise" and "comprising" do not exclude elements or steps which are present but not listed in the description and the claims.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the subject matter described herein, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

The invention claimed is:

1. An order processing system comprising:
at least one server comprising:
a first one or more automated virtual systems or machines, and
a second one or more automated virtual systems or machines, further wherein:
an order receiving unit is implemented by the first one or more automated virtual systems or machines, and
a benefit determination unit is implemented by the second one or more automated virtual systems or machines;
a plurality of computing devices communicatively coupled to the at least one server and a dynamically updatable provider database over a network;
the at least one server communicatively coupled to the dynamically updatable provider database;
the benefit determination unit communicatively coupled to the order receiving unit and the dynamically updatable provider database;
the order receiving unit implemented by the first one or more automated virtual systems or machines performs a first workload by receiving a plurality of orders from the plurality of computing devices via one or more digital interfaces, wherein:
each of the plurality of orders is associated with one of a plurality of customers, and
each of the plurality of orders is indexed with an order specification;
the dynamically updatable provider database stores a plurality of provider identifier codes (PICs), wherein:
each PIC is individually associated with:
a provider,
at least one benefit offered by the provider, wherein each benefit is indexed, individually, with a criterion, and
a historical credit information of the provider;
the benefit determination unit implemented by the second one or more automated virtual systems or machines performs a second workload by executing instructions for each of the plurality of orders to:
receive, from the order receiving unit, the corresponding order specification,
determine at least one desired criterion based on at least one of:
a location of the provider, and
a location of the corresponding customer,
identify, using automated geographical positioning, a preferred PIC from the dynamically updatable provider database for the received order specification based upon the at least one desired criterion,
determine, for the identified preferred PIC, a credit difference to be adjusted to facilitate access to at least one benefit,
adjust a corresponding value of the order based on the determined credit difference wherein:
the adjusting comprises increasing or decreasing the corresponding value to an amount for which at least one benefit is offered by the preferred PIC,
update the historical credit information of the provider of the identified preferred PIC, and
facilitate access to the at least one benefit via one of the plurality of computing devices or network;
at least one of:
the first one or more automated virtual systems or machines, or
the second one or more automated virtual systems or machines, is adapted based on at least one of:
the first workload, or
the second workload.

2. The system of claim 1, wherein:
the adapting comprises either:
adding one or more automated virtual systems or machines, or
closing one or more automated virtual systems or machines.

3. The system of claim 1, wherein:
each of the plurality of orders is associated with the one of the plurality of customers via a customer identifier code (CIC);
the CICs of the plurality of customers are stored in a dynamically updatable customer database, wherein:
each CIC is individually associated with a historic credit data of the corresponding customer; and
the executing of the instructions comprises executing instructions to update the historic credit data with the credit difference for the CIC of the corresponding customer.

4. The system of claim 1, wherein the historical credit information comprises at least one of:
an order history,
a customer ledger,
a payment history,
a credit utilization trend and ledger,
a balance tracker of all accumulated credit values, and
an order pattern.

5. The system of claim 1, wherein:
the benefit determination unit implemented by the second one or more automated virtual systems or machines comprises a filtering unit; and
the executing of the instructions further comprise instructions to:
perform, using the filtering unit, real-time or near-real-time adaptive grouping of two or more of the plurality of orders based on one or more parameters.

6. The system of claim 1, wherein the determining of the at least one desired criterion is further based on one or more of:
a minimum order specification to accept the received order,
a minimum order specification to deliver the received order,
a pre-defined order specification to handle the received order in a complimentary fashion, and
a required specification to ship the received order in a complimentary fashion.

7. The system of claim 1, wherein for each of the plurality of orders, the receiving of the corresponding order specification occurs as soon as the order is received.

8. The system of claim 1, wherein the dynamically updatable provider database and the plurality of orders are accessible on a distributed ledger.

9. The system of claim 1, wherein the adapting is based on one or more other characteristics.

10. The system of claim 1, wherein:
the first one or more automated virtual systems or machines is managed by a first hypervisor;
the second one or more automated virtual systems or machines is managed by a second hypervisor; and
the adapting comprises at least one of:
the first hypervisor adapting the first one or more automated virtual systems or machines based on the first workload; and the second hypervisor adapting the second one or more automated virtual systems or machines based on the second workload.

11. A method for order processing, wherein:
an order receiving unit is implemented by a first one or more automated virtual systems or machines, and
a benefit determination unit is implemented by a second one or more automated virtual systems or machines;
the method comprising:
performing, by the order receiving unit implemented by the first one or more automated virtual systems or machines, a first workload by:
receiving, by the order receiving unit, a plurality of orders from a plurality of computing devices via one or more digital interfaces, wherein:
each of the plurality of orders is associated with one of a plurality of customers, and
each of the plurality of orders is indexed with an order specification;
storing, in a dynamically updatable provider database, a plurality of provider identifier codes (PICs) wherein:
each PIC is individually associated with:
a provider,
at least one benefit offered by the provider, wherein each benefit is indexed, individually, with a criterion, and
a historical credit information of the provider; and
performing, by the benefit determination unit implemented by the second one or more automated virtual systems or machines, a second workload by executing instructions for each of the plurality of orders to:
receive, from the order receiving unit, the corresponding order specification,
determine at least one desired criterion based on at least one of a location of the provider and a location of the corresponding customer,
identify, using automated geographical positioning, a preferred PIC from the dynamically updatable provider database for the received order specification based upon the at least one desired criterion,
determine, for the identified preferred PIC, a credit difference to be adjusted to facilitate access to at least one benefit,
adjust a corresponding value of the order based on the determined credit difference wherein:
the adjusting comprises increasing or decreasing the corresponding value to an amount for which at least one benefit is offered by the preferred PIC,
update the historical credit information of the provider of the identified preferred PIC, and
facilitate access to the at least one benefit via one of the plurality of computing devices or network; and
adapting at least one of:
the first one or more automated virtual systems or machines, or
the second one or more automated virtual systems or machines,
based on at least one of:
the first workload, or
the second workload.

12. The method of claim 11, wherein:
the adapting comprises either:
adding one or more automated virtual systems or machines, or
closing one or more automated virtual systems or machines.

13. The method of claim 11, wherein:
the order specification comprises a location of one of the plurality of computing devices;
each PIC is indexed with a geographical positioning of the provider associated with the PIC; and
the identifying of the preferred PIC is based on the location of the one of the plurality of computing devices and the geographical positioning of the associated provider.

14. The system of claim 11, wherein:
each of the plurality of orders is associated with the one of the plurality of customers via a customer identifier code (CIC);
the method comprises:
storing the CICs of the plurality of customers in a dynamically updatable customer database, wherein:
each CIC is individually associated with a historic credit data of the corresponding customer; and
the executing of the instructions further comprises executing instructions to:
update the historic credit data with the credit difference for the CIC of the corresponding customer.

15. The method of claim 11, wherein:
the at least one of:
the first one or more automated virtual systems or machines. or
the second one or more automated virtual systems or machines,
uses at least one of parallel processing or multitasking.

16. The system of claim 11, wherein the at least one benefit is selected from:
a free shipping,
a discount,
a free item,
a membership,
an upgrade,
a gift,
a cash back,
a special access,
an extended warranty,
a loyalty credit,
a complementary perk,
an extended payment term,
a free installation service,
a cancellation charges waive off,
a discount coupon for another order, or
a combination thereof.

17. The method of claim 11, wherein the identifying of the preferred PIC is performed using one or more machine learning algorithms.

18. The method of claim 11, further wherein:
the executing of the instructions comprises executing instructions to:
identify a first set of PICs from the provider database based on the location of the corresponding customer and the corresponding order specification,
compare, using automated geographical positioning, the customer location information with each provider location data to determine a fulfillment requirement associated with each provider of the first set of PICs, wherein:
the fulfillment requirement comprises a shipping value and related requirements of the received order, and
select the preferred PIC from the first set of PICs to access the least one benefit based on the determined fulfillment requirement.

19. The method of claim 17, wherein the one or more machine learning algorithms comprise at least one of a clustering algorithm or a recommendation algorithm.

20. The method of claim 11, wherein the adjusting is based on a dynamic pricing algorithm.

* * * * *